United States Patent [19]

Stevens

[11] Patent Number: 4,896,914
[45] Date of Patent: Jan. 30, 1990

[54] ROBOTIC HAND WITH SHAPE DETERMINATION CAPABILITIES

[76] Inventor: S. Scott Stevens, Rte. 1, Box 302A, Harriman, Tenn. 37748

[21] Appl. No.: 80,616

[22] Filed: Aug. 3, 1987

[51] Int. Cl.$^4$ .............................................. B25J 9/14
[52] U.S. Cl. ................... 294/88; 294/119.1; 294/902; 901/37; 901/39; 269/267
[58] Field of Search ................ 294/86.4, 88, 87.1, 294/99.1, 1.1, DIG. 2, 902, 906, 66.1, 907, 119.1; 269/32, 90, 265, 266, 267; 901/30, 31, 36, 37, 39

[56] References Cited

U.S. PATENT DOCUMENTS

| 4,047,709 | 9/1977 | Thyberg et al. | 269/266 |
|---|---|---|---|
| 4,088,312 | 5/1978 | Frosch et al. | 269/266 |
| 4,572,564 | 2/1986 | Cipolla | 294/88 |
| 4,609,220 | 9/1986 | Scott | 294/87.1 |
| 4,632,444 | 12/1986 | Martinez et al. | 294/88 |
| 4,770,455 | 9/1988 | Collins, Jr. | 269/267 X |

FOREIGN PATENT DOCUMENTS

| 876420 | 10/1981 | U.S.S.R. | 294/902 |
|---|---|---|---|
| 889423 | 12/1981 | U.S.S.R. | 294/902 |

Primary Examiner—Johnny D. Cherry
Assistant Examiner—Dean J. Kramer
Attorney, Agent, or Firm—Pitts and Brittian

[57] ABSTRACT

A robotic hand to grasp objects, either of regular or irregular configuration, and to provide information related to the shape of the object. Numerous embodiments are described: each embodiment includes a housing and a plurality of finger units that are deployed from the housing, with tips of fingers contacting the object at a sufficient number of points to support the object. Each finger unit is provided with a guide whereby the finger unit is constrained to move along a fixed path. Pneumatic, hydraulic and electromechanical deployment systems are typically used. Deployment is in unison, individually or in groups. Each finger unit is provided with a suitable form of distance measuring system so as to determine the distance of travel of each finger unit from the housing along the fixed path to its position of contact. Typical systems for distance measurement include resistive, capacitive, inductive and digital encoder reading. The embodiments are of particular value when operated remotely, and where visual observation of an object is obscured. Information obtained from the distance measuring systems is processed in a computer to determine actual shape and other shape parameters of the object.

36 Claims, 10 Drawing Sheets

ROBOTIC HAND WITH SHAPE DETERMINATION CAPABILITIES

FIELD OF INVENTION

This invention relates generally to devices for contacting/grasping objects, for obtaining information as to the shape of those objects, and for use with remotely operated equipment. More specifically, the invention relates to a remotely-operated "robotic hand" for contacting/grasping an object and for generating information by which the shape of the object can be deduced even though the object is not seen by an operator.

BACKGROUND ART

In the remote manipulator art, numerous types of "hand" units have been devised for grasping an object to move that object from one location to another, to perform some operational task, etc. Most of these hand units (commonly called "end effectors") are simply a pair of fingers or tongs that move in a parallel relationship toward or away from each other. Typically, these tongs that are to grasp the object have a resilient surface to improve grasping friction, and some units provide for pressure-related feedback to insure proper grasping force.

In order to grasp an object using these devices of the prior art, the device must be seen, either directly or through the use of video equipment, so that a proper grasping location on the object is utilized to minimize inadvertent disengagement. For example, generally spherical objects must be grasped at a major diameter, necked-type objects grasped at the neck, etc. Where objects of a particular configuration are to be grasped routinely, tong units of a configuration matching the object can be used. Highly irregularly shaped objects, particularly those with sloped surfaces, are grasped with only great difficulty, perhaps after several attempts. Further, if the object is unknown in configuration when grasped, it must be directly or indirectly viewed to ascertain its shape. For example, a bolt might be grasped for use in assembling a piece of equipment; however, a view of the bolt might be necessary to ascertain the type of head (hexagonal or square), the length of the threaded portion, etc.

There are applications for remotely operated contacting/grasping devices where the object is only partially seen or even cannot be seen by conventional means. For example, in underwater exploration the murky waters usually encountered prevent any viewing. Also, light distortion hampers exact positioning of the device. Thus, it becomes important that the object be grasped without such exact positioning. Also, it is desirable to obtain information that can be used to deduce the shape of the object that is to be contacted/grasped. The terms contact/grasped or contacting/grasping, etc., as used herein are meant to cover those alternates: just contacting an object for whatever purpose (usually non-moving); and grasping an object with the primary function of motion of the object. Other suitable terms for this operation are "engaging", "engage" and "engaged".

Numerous special configurations of grasping means have been developed, some of which are designed to grasp objects of unusual exterior shape. One such device is described in U.S. Pat. No. 4,572,564, issued to T. M. Cipolla on Feb. 27, 1986. Other typical devices are described in U.S. Pat. Nos. 4,047,709, issued to B. S. J. Thyberg, et al. on Sept. 13, 1977; 4,632,444, issued to M. R. Martinez et al on Dec. 30, 1986; and 4,088,312, issued to NASA on May 9, 1978. None of these devices are adapted for use as a hand of a remotely operated device and none of these, except for '444, provide signals related to the shape of the object contacted/grasped.

Accordingly, it is a principal object of the present invention to provide a hand unit for a remotely operated device, said hand providing a capability to contact/grasp a surface having either a regular or irregular configuration It is a further object of the invention to provide a device for use in contacting/grasping an object having an unknown surface configuration, the device providing information from which the shape of the object can be obtained.

It is another object of the invention to provide a device which can grasp an object and then reorient the object into a selected new orientation.

These and other objects of the present invention will become apparent upon a consideration of the drawings referred to hereinafter in combination with the detailed description thereof.

SUMMARY OF INVENTION

In accordance with the present invention, there is provided a unit for contacting/grasping an object, the device providing information for determining the shape (contour) and other parameters of the surface contacted/grasped. More specifically, the device has a housing member and a plurality of fingers that can be moved out of the housing to contact/grasp an object of any surface configuration from at least two generally opposite sides. The fingers are constrained to move in a direction along their central axes; however, they can have any appropriate cross-sectional configuration. The fingers can be either individually or collectively moved out of the housing to contact/grasp the surface of the object. Hydraulic, pneumatic, or electromechanical means are preferably used for this movement. Each of the fingers is provided with appropriate means to provide a signal related to the extent of travel out of the housing, this extent of travel then being used for determining the shape of the object. Position sensing typically is accomplished by resistive, capacitive, digital code, or inductive means. The outputs of the sensors are, through appropriate programming, converted into shape determination when necessary or desirable. Other parameters of the object can also be computed.

DETAILED DESCRIPTION OF THE INVENTION

Figure 1:
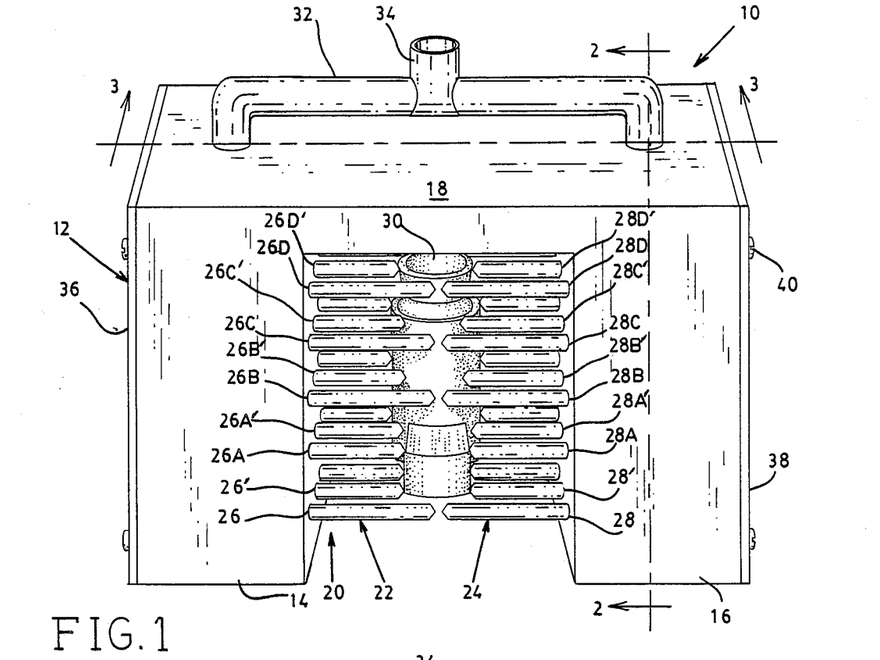
FIG. 1 is a frontal isometric view of a device embodying principles of the present invention, the device is shown as contacting/grasping an irregularly shaped object.

Shown generally at 10 in FIG. 1 is a frontal perspective view of one embodiment of a device that embodies the principles of the present invention. This embodiment has a housing 12 formed of two side chambers 14, 16 joined by a top support 18. These chambers define an object-receiving opening 20. Extendable from each of the side chambers 14, 16 are a plurality of finger arrays 22, 24 respectively. These fingers (also referred to hereinafter as finger units) are arranged in a selected array as, for instance, confronting groups of fingers in a plurality of rows and columns as illustrated. Thus, a finger 26 of one array confronts finger 28 in the opposing array. Of course other arrays can be utilized as well as non-confronting relationships. For purposes of explanation, fingers in a column are, for example, identified as 26, 26A, 26B, 26C, 26D. In a row, the fingers are identified as 26, 26', etc., in one row, and 26A, 26A', etc., in the next row with corresponding identification. Similarly, the fingers in array 24 are identified as 28, 28A-D, and 28', and 28A-D', etc., as shown. Depicted in this view is an object (e.g., a hollow vessel) 30 contacted/grasped by this embodiment of the invention.

As will be discussed in more detail hereinafter, the fingers of the arrays 22, 24 are piston-like elements that can be moved in fixed paths axially along their individual long axes. This embodiment of FIG. 1 (and FIGS. 2 and 3) utilizes fluid (gas or liquid) pressure applied to the interior of side chambers 14, 16 through a header 32 which is attached to conduit 34. Of course, the top support 18 can be used as the header if desired. Application of pressure through the conduit 34 and header 32 causes the finger arrays 22, 24 to be moved toward and possibly contact the object 30. It can be seen, for example, that fingers 26 and 28 do not contact the object and neither do fingers 26B, 28B, 26D and 28D. Certain of the other fingers do not travel a full distance before they contact the object. It can be seen that if the pressure is retained, the object is securely held and can be moved from place to place by moving the device 10. Reversing the pressure, i.e. making the pressure within the side chambers 14, 16 less than the exterior pressure, causes the fingers of each array 22, 24 to withdraw from the object.

Although not shown in FIG. 1, each of the fingers in arrays 22, 24 is provided with means to ascertain the amount of (distance) movement out of the chambers 14, 16. Details of typical distance measuring means will be described hereinafter. Although each of the distance measuring means will have electrical leads, these leads are not illustrated in FIG. 1 (or FIG. 2-5); however, such leads would be carried through the top support 18 to external circuits. This illustrated embodiment has removable end covers 36, 38 on the side chambers 14, 16 which are typically retained with screws 40. Of course, it will be understood that the chambers can be formed with other constructions suitable for the various applications of the device 10.

Figure 2:
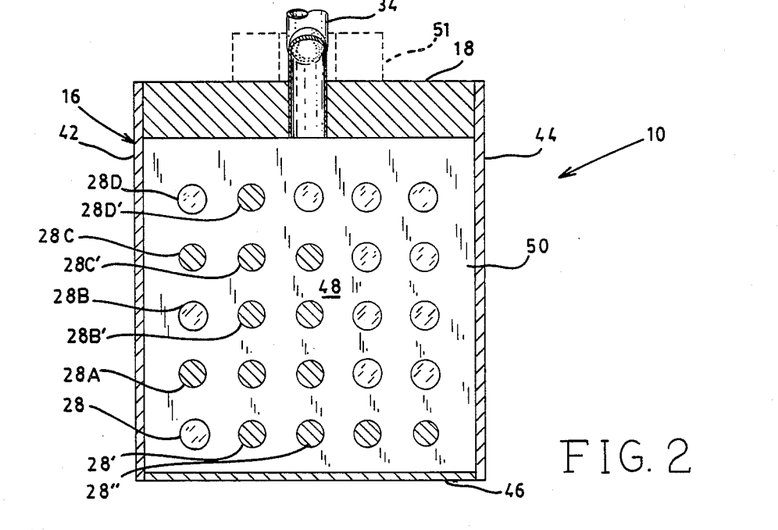
FIG. 2 is a vertical section of the device of FIG. 1 taken at 2—2 thereof.

Referring now to FIG. 2, this is a vertical section taken at 2—2 of FIG. 1. Thus, it can be seen that side chamber 16 is formed by the aforementioned top support 18 together with walls 42, 44, 46, 48 (and the cover 38). These walls and cover define a cavity 50 surrounding the fingers, with the fingers penetrating the wall 48. Since fingers 28, 28B and 28D, for example, are fully extended into the opening 20 (see FIG. 1) the ends of these fingers are visible in this cross-section. However, fingers 28', 28A, 28A', etc., are not fully extended and thus the plane of the cross-section passes through these fingers as shown. Although the rear portion of the object 30 cannot be seen in FIG. 1, the position of the rearward fingers of row 28, 28', 28", etc., indicates that the object 30 has a projection at the rear against which these fingers are contacted. In this FIG. 2, shown in phantom lines, is a collar 51 useful for mounting the present invention to a manipulator arm, for example. Other appropriate mounting means can, of course, be utilized.

Figure 3:
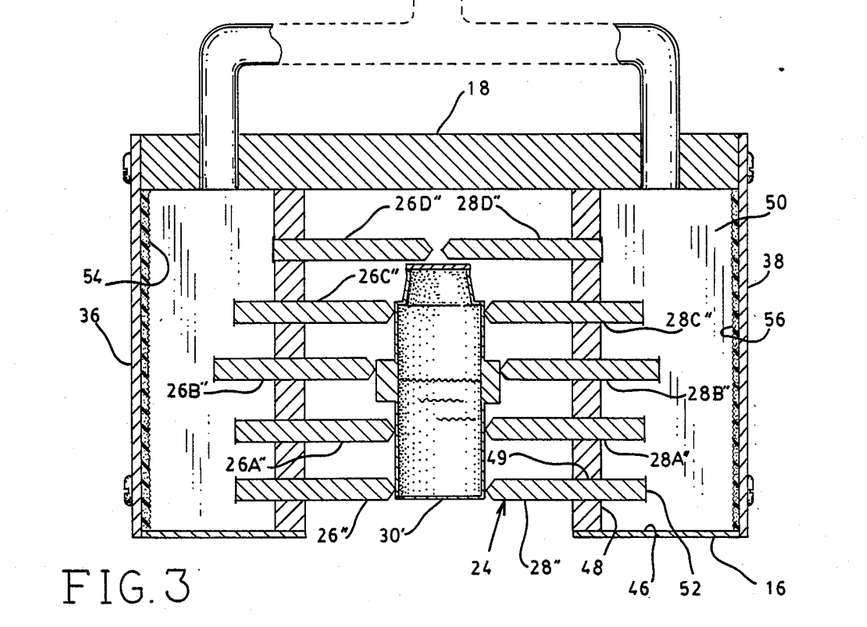
FIG. 3 is a vertical section of the device of FIG. 1 taken at 3—3 thereof except with an object of a different external shape.

FIG. 3 is a vertical cross-sectional view of the device of FIG. 1 taken at 3—3 therein. Illustrated is an object 30' of a different configuration however to further illustrate movement of the fingers. It can be seen that, for example, the fingers of array 24 pass through closely fitting openings 49 in the wall 48 (the structure in side chamber 14 is identical). These openings define "guide means" whereby the finger units move along fixed paths. Each finger can have a slightly enlarged head 52 as indicated on finger 28". This prevents loss of a finger from the side chamber 16. Of course, other restraining means can be used. Resilient pads 54, 56 are shown as attached to the inner wall of covers 36, 38, respectively. These provide cushioning as the fingers are withdrawn into the side chambers 14, 16.

Figure 9:
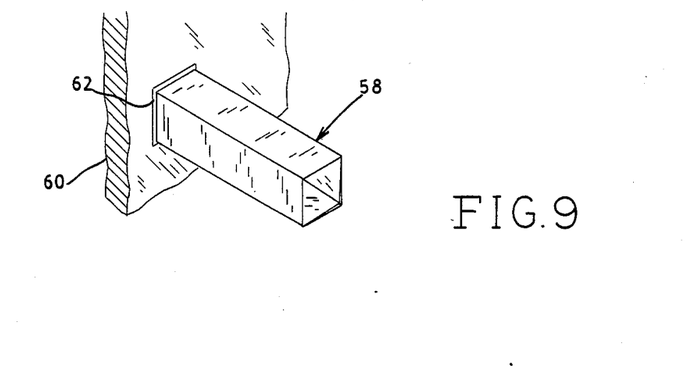
FIG. 9 is a perspective drawing of a finger useful in the present invention, the finger having a rectangular cross-section.

Prior to a discussion of other embodiments of a total device of the present invention, it should be understood that the fingers as illustrated in the Figures can have other cross-sectional shapes. One such alternative cross-section is illustrated at 58 in FIG. 9; e.g., rectangular or square in cross-section. This is shown passing through a support wall (guide) 60, with a seal 62 surrounding the finger to minimize leakage around the finger. When perfectly linear motion is to be utilized, and no rotation is required, the fingers can have other cross-section such as triangular, cross-shaped, oval, etc.

Referring again to FIG. 1, the operation of this embodiment will be explained. By reducing the pressure within the chambers 14, 16 relative to the external pressure, all fingers of each array 22, 24 are fully withdrawn with but the most extreme end protruding into the opening 20. The device is placed over the object 30. There is no need for the object to be centered or oriented vertically as shown, i.e. it can have any position or orientation. When the object is in the opening 20, pressure is applied to the interior of the chambers 14, 16 and the fingers move out along their fixed paths to contact the object in the manner illustrated. The object can be released by reducing the pressure to withdraw the fingers. This is referred to herein as applying a "reverse pressure".

As stated above, each finger is equipped with means for determining the extent of movement of the finger to the object. These means produce electrical signals directly related to these distances. Thus, through appropriate programming of the signals, an "identification" of the shape of the object can be generated. Conventional signal processing as described hereinafter can be used to create accurate depiction of the shape.

In the embodiment of FIGS. 1–3, the fingers are extended or retracted in unison by applying the same pressure against all of the fingers. Furthermore, these fingers are shown as only being supported by one wall (other guide means could be added). While this construction is suitable for certain applications of the present invention, other applications may preferably require individual finger operation and/or greater support. Finger units to accommodate this individual movement and additional support and guidance are illustrated in FIGS. 10 and 11.

Figure 10:
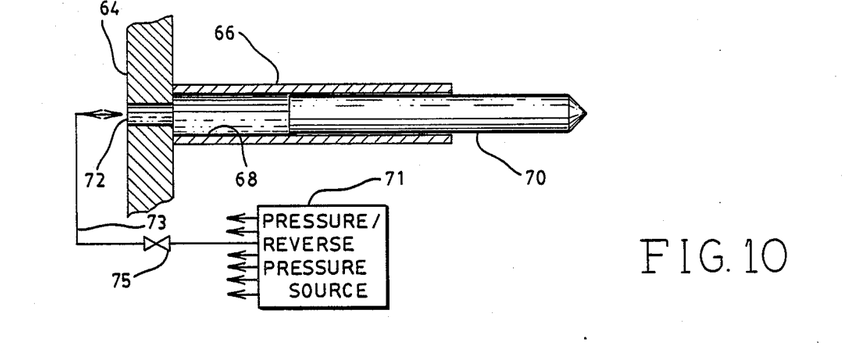
FIG. 10 is a fragmentary drawing illustrating an alternative support for an axially moving finger and a means for individual finger movement if desired or necessary.

Referring first to FIG. 10, a portion of a support wall 64 is illustrated. Mounted from this wall is a finger support and guide sleeve 66 defining an internal cylindrical recess 68. Fitting within this recess 68 is a piston-like finger 70. The wall is provided with an opening 72 communicating with the recess 68 whereby a pressure (or reverse pressure) from a source 71 can be applied through the opening causes the finger to move axially in the recess. Alternatively, rather than an opening through the support wall, the wall 64 can be imperforate and an opening can communicate with the recess 68 near the wall. In either construction, a separate feed line 73 with appropriate valving 75, can communicate with the opening such that the valving can control the application of pressure (or reverse pressure) to individual or sub-groups of cylindrical recesses and thereby affect selective movement of individual fingers or groups of fingers.

Figure 11:
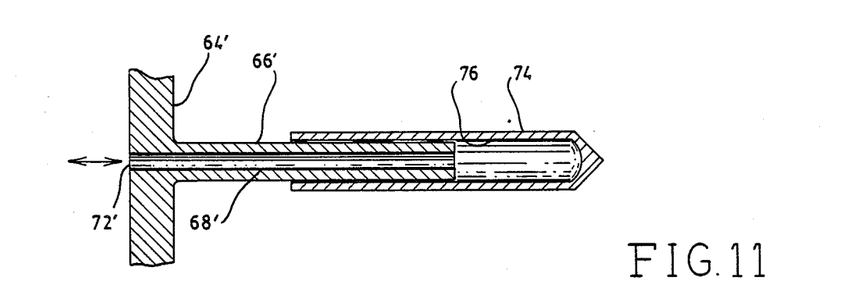
FIG. 11 is a fragmentary drawing illustrating a further alternative support for an axially moving finger and means for individual finger movement if desired or necessary.

The finger embodiment of FIG. 11 provides the same support, guidance and individual actuation in a slightly different manner. In this embodiment, a support wall 64' carries a support tube 66' having a substantially axial passageway 68'. Communication with this passageway is through opening 72' (or an opening through the wall of support tube 66'). Surrounding the support tube 66' is a piston-like finger 74 that defines a cylindrical recess 76 to receive the support tube. As in the embodiment of FIG. 10, individual connection can be made to a source of pressure (and reverse pressure) to provide for individual finger movement in an array of fingers.

Figure 4:
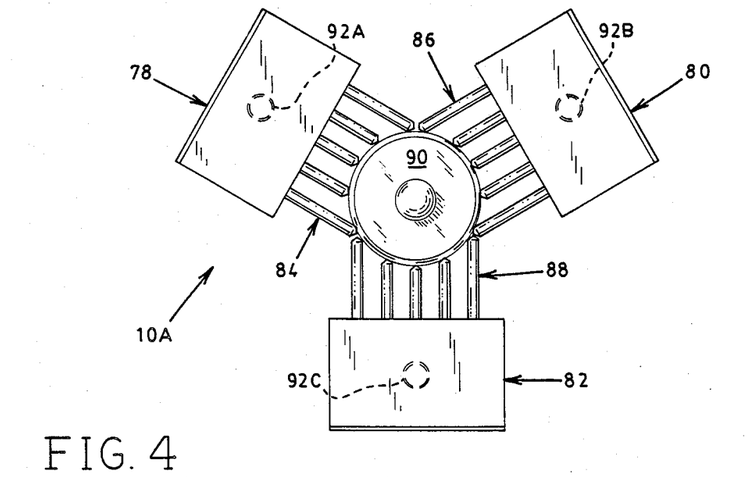
FIG. 4 is a bottom view of another embodiment wherein three sets of a plurality of fingers are utilized to contact/grasp an object generally centered therebetween.

In FIG. 4 another embodiment 10A of the present invention is illustrated. This embodiment functions in a manner similar to that of FIGS. 1-3 but is constructed utilizing three chambers 78, 80 and 82, each having an array of fingers 84, 86 and 88, respectively. Since this is a bottom view of the device 10A, the other fingers in the columns of the arrays are not visible. These arrays are illustrated in a position to grasp a generally cylindrical object depicted at 90. Although not shown, the chambers are mounted to an appropriate frame or support to form a housing whereby the positional relationship of the chambers remains fixed during operation of the device 10A. It will be understood that the frame or support can be structured for the selective positioning of the chambers if desired. Further, it will be understood that the chambers can have alternative positional relationship to each other rather than the equal angular (120 degree) relationship that is illustrated. Each of the chambers is provided with a port 92A, 92B, 92C for the application of pressure or reverse pressure for effecting axial movement of the fingers in each array.

Figure 5:
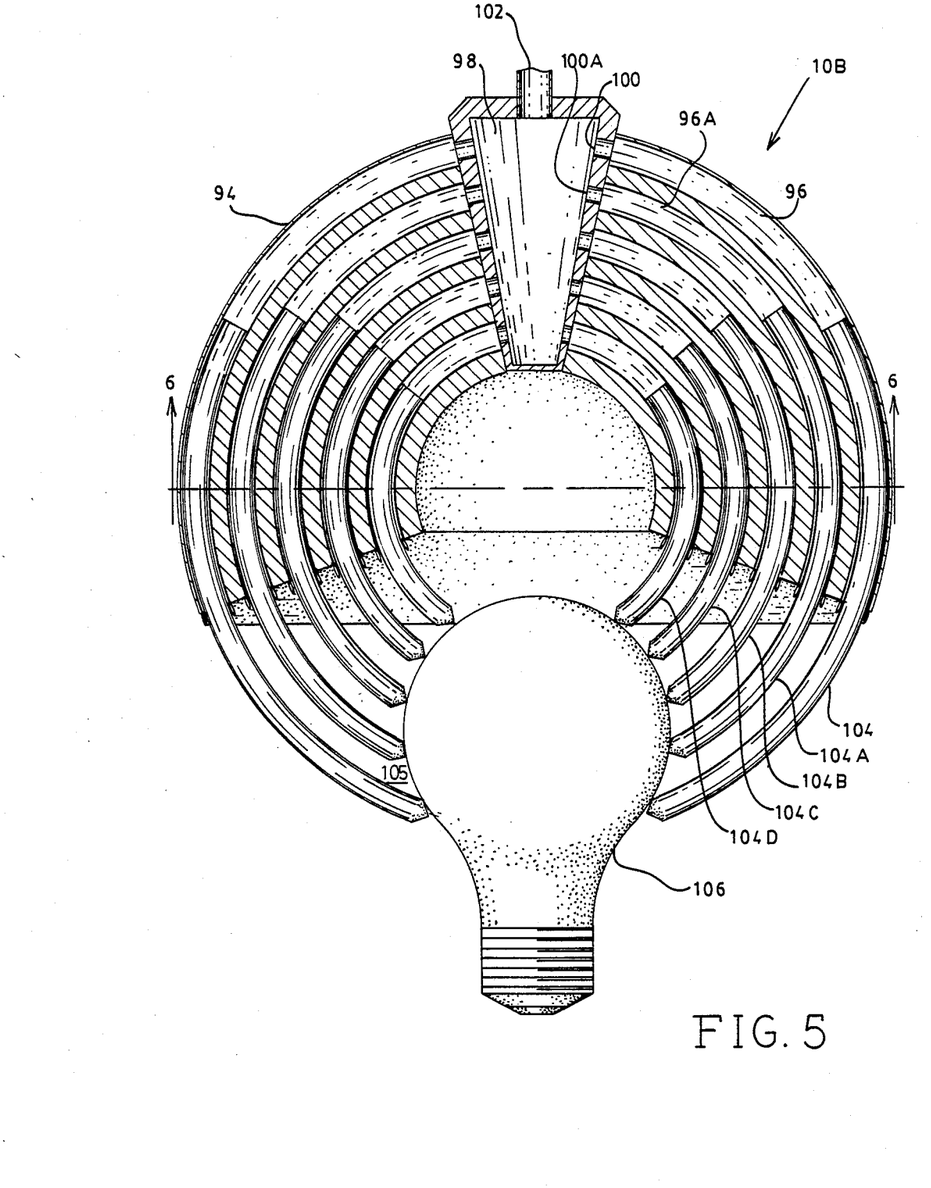
FIG. 5 is a vertical cross-section through a substantially spherical contacting/grasping device according to the present invention wherein the fingers move along segments of circular paths toward and away from an object.

Referring now to FIG. 5, shown therein at 10B is a generally hemi-spherical grasping/contacting device (a generally hemi-cylindrical device could utilize substantially the same construction). This embodiment is fabricated from a body (housing) 94 that defines a plurality of cavities 96, 96A, etc., the cavities being along the circumference of circular paths having a center of the body 94 as their center. Each of these cavities communicate with a common header 98 through openings 100, 100A, etc., in a manner similar to the construction of FIG. 10. A port 102 is provided to apply pressure or reverse pressure to the header and thus to the cavities. Positioned within each cavity is a finger such as 104, 104A, etc., of circular cross-section, with these fingers adapted to move with one degree of freedom along their long axes in fixed paths as established by the cavities. Thus, they can be withdrawn into the body 94 or extended from the body into a region 105 corresponding to the remainder of a sphere (or cylinder) to grasp an object, such as at 106. For clarity in this drawing, fingers that are in a rearward portion of the body 94 (if hemispherical) are not shown.

Figure 6:
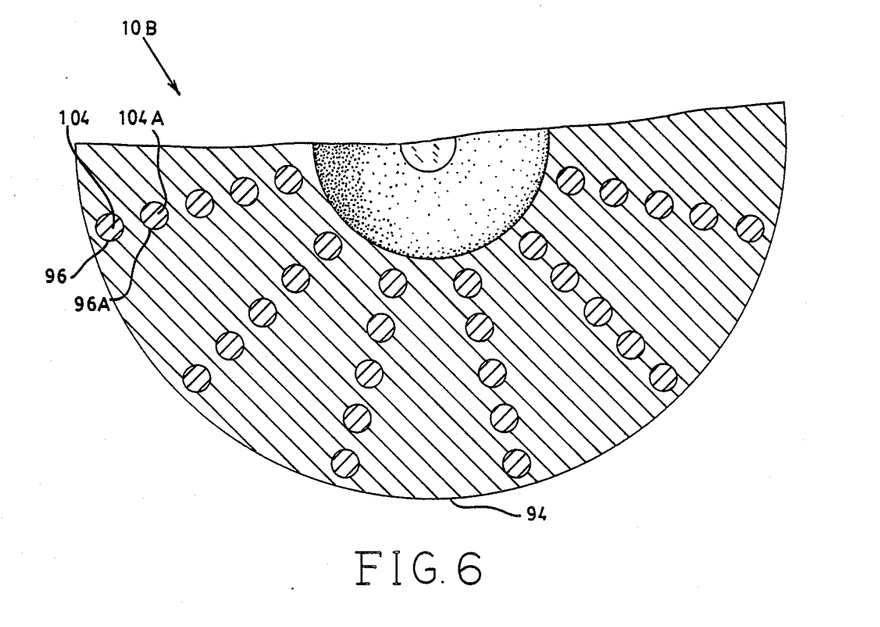
FIG. 6 is a transverse sectional drawing of the embodiment of FIG. 5 taken at 6—6 thereof.

A transverse cross-sectional view of the embodiment 10B is illustrated in FIG. 6. Only approximately one-half of the total cross-section is shown: the remaining portion is a mirror image of that shown. In this view the other cavities and corresponding fingers are illustrated whereby a symmetrical array is depicted. In this embodiment 10B all finger units have the same cross-sectional size. The angular relationship of "columns" of fingers is illustrated as being about 30 degrees; however, any other selected uniform or nonuniform relationship can be used that will provide fingers to grasp/contact the object to achieve the desired operation.

Figure 7:
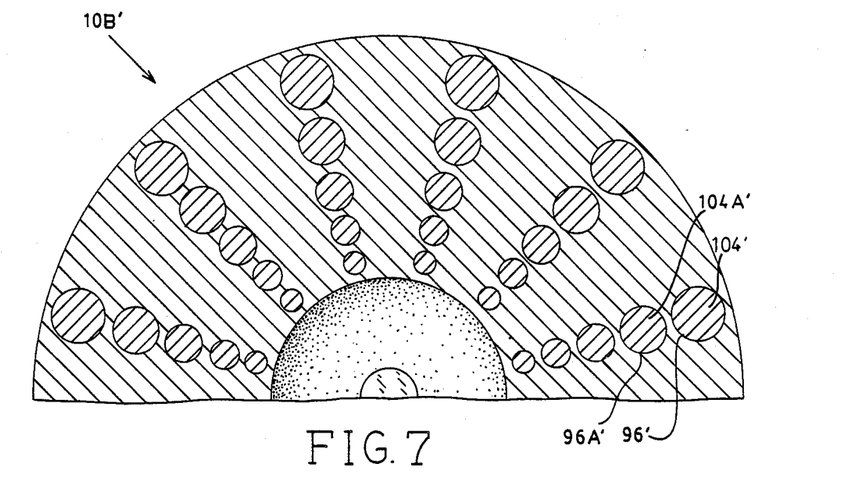
FIG. 7 is a transverse sectional drawing of an embodiment similar to that of FIG. 5 except that the cross-sectional area of the fingers decreases for the inner units to thereby permit use of a larger number of fingers if desired or necessary.

FIG. 7 is similar to FIG. 6 in that it is a partial cross-sectional view of an embodiment 10B' that is similar to embodiment 10B. The only change is a variation of the diameter of the cavities (e.g. 96', 96A', etc.,) and their respective fingers (e.g. 104', 104A') from a central portion to an outer portion. This structure permits use of a greater number of "columns" of fingers where desired or necessary.

Figure 8:
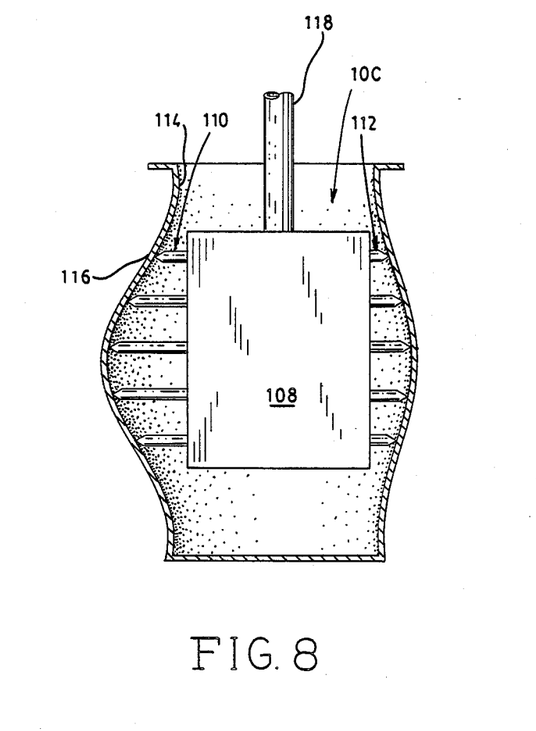
FIG. 8 illustrates an embodiment of the present invention constructed so as to contact/grasp the inner surface of an irregularly shaped hollow object.

In some applications, it may be desirable to grasp/contact the inner surface of a hollow object having an opening leading to that inner surface. An embodiment of the present invention for such applications is illustrated at 10C in FIG. 8. This embodiment has a body 108 from which finger arrays 110, 112 project in opposite directions so as to contact the inner surface 114 of an object 116. Only one column of fingers in arrays 110, 112 are illustrated; however, additional columns would be utilized in order to determine the shape of the surface 114. As in other embodiments, pressure or reverse pressure is applied to the body 108 through conduit 118 to effect axial movement of the fingers.

In the embodiments described hereinabove, the fingers of the robotic devices are actuated by fluids via pneumatic or hydraulic systems. The particular choice of a gas or liquid, respectively, is somewhat dependent upon the environment in which the device is used. When used in air, for example, air can be used as the operating fluid. Similarly, in a water environment, water is a suitable fluid. Of course, these are not the only fluids to use in these environments, and a person skilled in the art can make a proper selection. Further, there are some environments where leakage of the fluid around the fingers is not detrimental; in other uses, a seal can be used (as in FIG. 9) if leakage is to be prevented.

Figure 12:
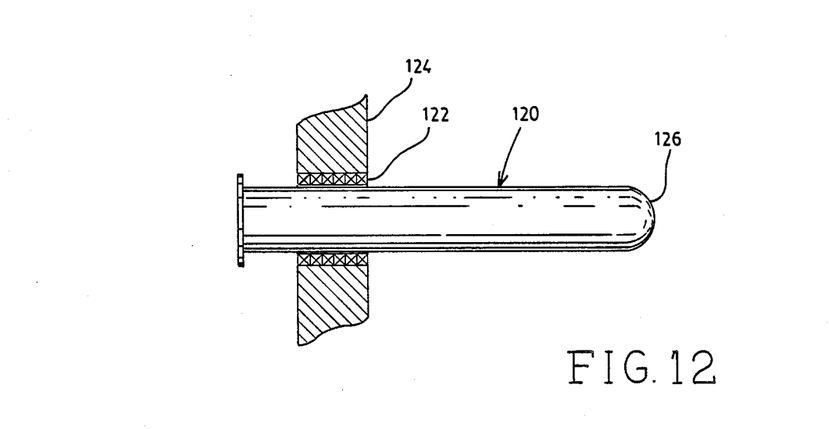
FIG. 12 is a drawing illustrating the use of linear motor principles for the purpose of axially moving individual fingers of an embodiment of the present invention.

The present invention is not limited to fluid operation of the fingers. For example, a finger unit embodiment such as illustrated at 120 in FIG. 12 can be used. This is a linear motor wherein sequential electrical energization of coils 122 in or near a support wall 124 causes the finger 120 to be moved axially relative to the wall as a "linear motor". The finger 120 is shown in FIG. 12 to have an alternately configured contacting end 126 as compared to the contacting end of previously illustrated finger units. Although a sharply pointed contacting end is generally preferred when the contour of a highly irregular surface is to be computed (since the tip usually contacts the object rather than some point to the rear of the tip) objects having more regular surfaces, e.g. nearly rectangular or cylindrical, can be grasped and their contour deduced with a finger tip of other configuration. It is a matter of exactly determining the distance traveled by the finger, and the shape of the finger tip, that provides information as to the shape.

Figure 13:
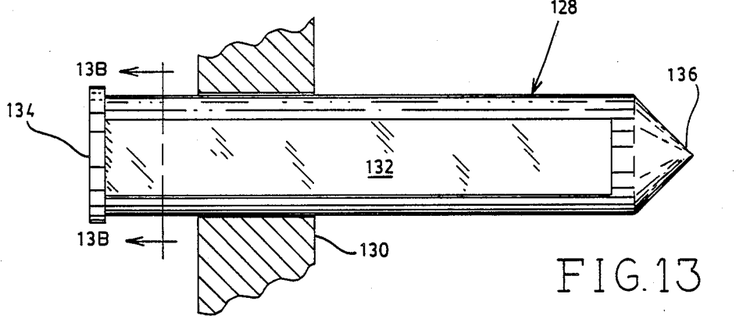
FIG. 13 is a drawing illustrating a construction of a finger unit of the present invention that is amenable for application of motion detection means by providing a flat surface along the length of the generally cylindrical finger.
Figure 18:
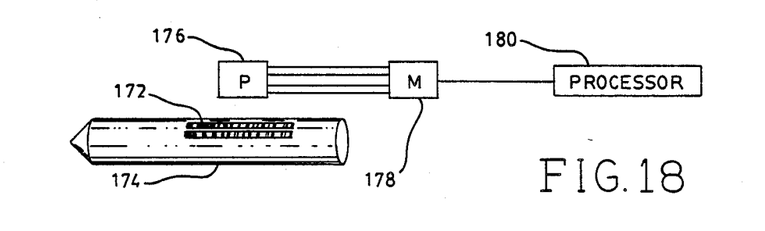
FIG. 18 is a schematic diagram of a circuit wherein encoder tracks and a reader for those tracks determines finger unit displacement.

The exact position of each and every finger of the present invention can be determined using numerous methods. A finger particularly adaptable for use with a linear movement detection device is illustrated at 128 in FIGS. 13, 13A and 13B. The finger is supported and guided in a header 130, and is provided with a flat surface 132 along the length thereof from proximate an enlarged head 134 to proximate the object-contacting end 136. This construction provides for the placement of an appropriate detection means 138 proximate this flat surface 132; for example, a reader for coded information can be used as illustrated in FIG. 18.

Figures 13A, 13B, 14:
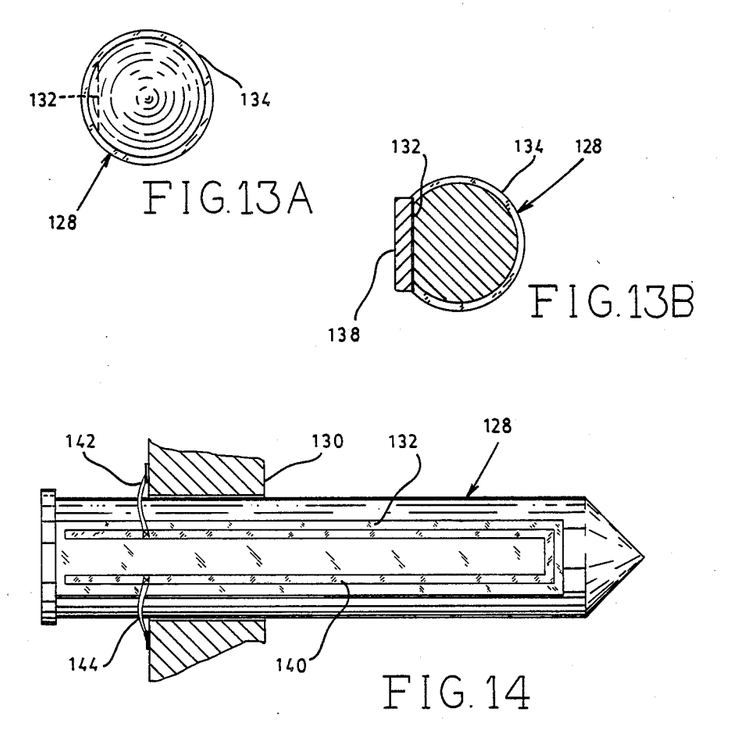
FIG. 13A is an end view of the finger unit of FIG. 13.
FIG. 13B is a cross-sectional view of the finger unit of FIG. 13 taken at 13B—13B showing placement of a signal pick-off unit in close proximity thereto.
FIG. 14 is a drawing illustrating the placement of a resistance unit on the flat surface of the finger of FIG. 13 together with a pair of sliding contacts.

A further use of a finger unit 128 having a flat surface 132 is illustrated in FIG. 14. Applied to this surface 132 is a resistance element 140; in this embodiment the resistance element is U-shaped. Insulatively mounted from the header 130 are a pair of slider units 142, 144 for contacting the resistance element. As the finger moves (under any form of motion), the resistance value between the slider units varies. When this varying resistance is part of a measuring circuit, the change in resistance is directly relatable to the amount of movement of the finger unit and thus the position of the tip 136.

Figure 15:
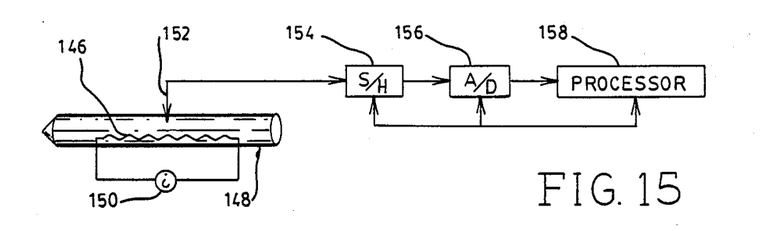
FIG. 15 is a schematic drawing illustrating a circuit to measure finger unit displacement with a resistance element along the finger unit.

A schematic diagram of a similar resistance-type movement detection system is illustrated in FIG. 15. In this embodiment a resistance element 146 extends along a finger unit 148. This resistance element is connected to a current source 150 (or a voltage source) such that there is a voltage developed along the resistance element. A fixed slider contact 152 moves along this resistance element as the finger unit moves; thus, an input voltage to a sample-and-hold (S/H) circuit 154 is proportional to the position of the finger unit. Since this is an analog signal, it is fed to an analog-to-digital (A/D) circuit 156, with the digital output then fed to an appropriate processing equipment 158. It will be understood that the S/H, A/D and processor are conventional circuits that would be known to one skilled in the art. Each finger unit would be monitored in a similar manner. High speed switching arrangements (multiplexing) can be incorporated whereby the S/H and A/D circuits can be used for a multiplicity of finger units.

Figure 16:
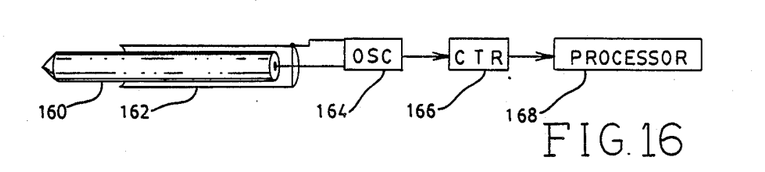
FIG. 16 is a schematic drawing illustrating the use of a finger unit as a part of a capacitor to change an oscillator frequency as a function of finger unit displacement.
Figure 17:
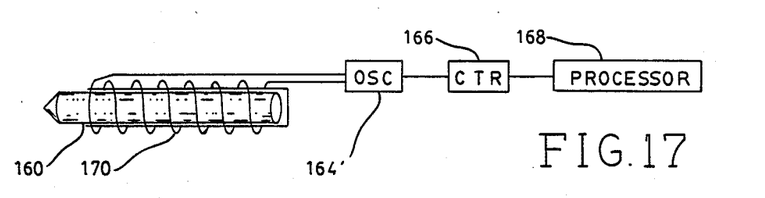
FIG. 17 is a schematic drawing illustrating the use of a finger unit in an inductive member to change an oscillator frequency as a function of finger unit displacement.

The position of finger units can also be determined by capacitive and inductive techniques as illustrated in FIGS. 16 and 17, respectively. In FIG. 16, for example, a finger unit 160, acting as one "plate" of a capacitor, moves within a sleeve 162 which is the other "plate". This capacitor is a portion of an oscillator circuit 164, with the output frequency thereof being a function of the position of the finger unit 160. The output of the oscillator is fed to a gated counter (CTR) 166 which measures that frequency, and a digital signal related thereto is fed to the processor 168 for converting the finger unit position into shape information about an object that the finger units contact.

A similar frequency-varying measurement is effected with the system illustrated in FIG. 17. The finger unit 160 moves within an inductor 170. This inductor changes impedance as a function of the position of the finger unit 160. Since the inductor is a part of the oscillator circuit 164', the CTR 166 detects the frequency change and provides a corresponding signal to the processor 168.

As referred to previously, encoder tracks 172 can be placed on the surface of a finger unit 174 as illustrated in FIG. 18. Typical means for creating these encoder tracks are: magnetic means, as commonly used in magnetic head-disk head position tracks; optical means, either reflective or transmissive, as provided in commercially available optical encoders; or conductive as found in commercially available "brush" encoders. Typically, these codes are arranged as one of several binary codes: natural binary; gray binary; or binary coded decimal. Thus, the code can depict distance along the finger unit. Positioned proximate the finger unit is a pickup unit 176. Information "read" from the encoder tracks by the pickup unit is fed into a memory unit 178 and thence to a signal processor 180. The memory unit can be a portion of the processor unit if desired.

Referring again to the matter of individual or sub group operation of the finger units (see FIGS. 10, 11, 12), this construction provides for a further advantage of the present invention. For example, there can be applications where the object being grasped in the robotic hand is to be realigned from its grasped position. This might involve realigning a bolt for properly engaging a threaded receptor. This can be accomplished by withdrawing a selected portion of the finger units and extending other finger units, without fully releasing the object, such that the position of the object is shifted into the desired alignment.

When a plurality of surface points are located on an object, conventional computational methods are known to provide general information as to the shape of the object (provide an iterative fit). Thereafter information as to the volume, the centroid and/or the principal axes of the object can be ascertained. Also, information from "unknown" shapes can be matched with that of known shapes in order to recognize features of the object, for example. Further, known techniques can be used to further refine the shape determination as by taking into account the shape of the finger unit tip.

Figure 19A:
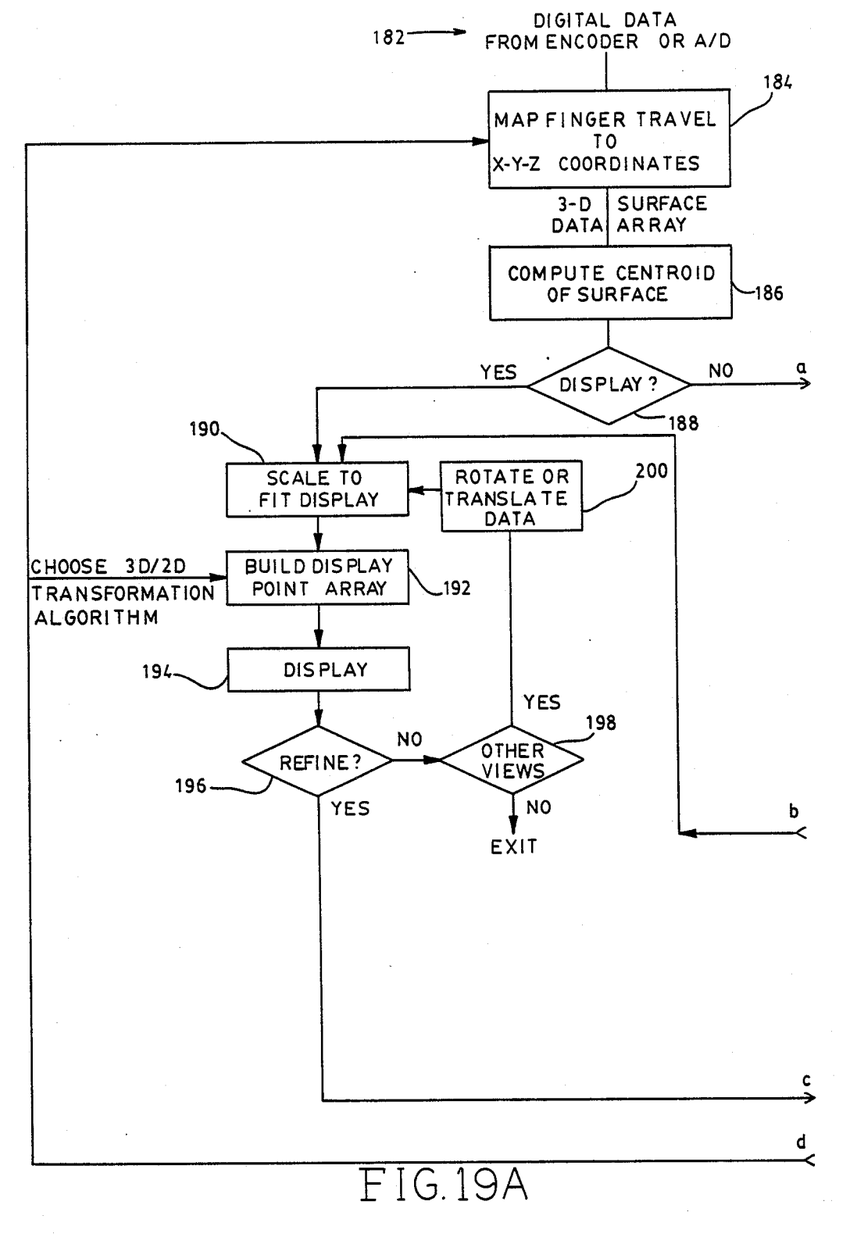
FIGS. 19A and 19B are complimentary portions of a flow diagram illustrating the computational steps for converting position signals derived from finger units into a determination of shape and other parameters of a contacted/grasped object.
Figure 19B:
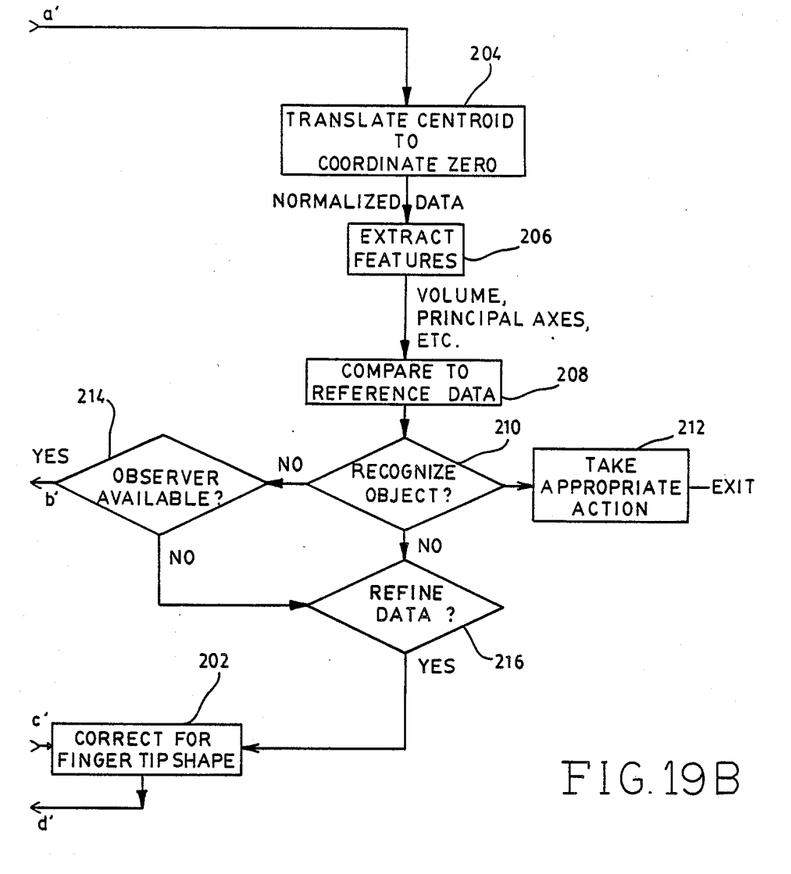

The manner of surface shape determination, as well as determining other characteristics of an object, can be explained by referring to FIG. 19. Several of the steps involve a yes/no selection, and then algorithms well known to persons skilled in the art perform the desired treatment of the information signals. Input signals, as at 182, are typically derived from the analog-to-digital (A/D) convertor, the gated counter (CTR), or the memory (M) shown in FIGS. 15–18. Of course, if other systems are utilized to determine the position of each finger, the input at 182 would be from those systems. Using a standard algorithm, or precomputed tables of finger linear travel versus 3-dimensional finger tip position (derived from the known fixed loci of finger position relative to the housing the input signals are converted into three-dimensional signals at 184. This provides the information in a 3-D surface data array. From this data the centroid of an object having that surface can be determined at 186 using an algorithm known in the art. Having made this determination, a user of the present device makes a choice (at 188) as to whether the shape is to be displayed or not. This selection usually is based upon whether there is an observer to review a display.

Assuming that the information is to be displayed, an appropriate scale for the data is selected at 190. This scaled data is re-converted to 2-D information using a conventional algorithm at 192, and then impressed upon an appropriate display unit 194 (usually a CRT). Depending upon the adequate recognition of the object, a choice can be made at 196 as to whether the data needs further refining in order to display an object that can be recognized or has a sufficiently detailed surface. If no further refinement is desired, there is a choice (at 198) as to whether other views of the object are desired. If the choice is "no", the work is complete. If the answer is "yes", the information is transmitted for a "rotation" or "translation" at 200 such that the information can be displayed in the desired view just as the original information was displayed.

It will be recognized that depending upon the shape of the surface of the object and the configuration of the ends of the fingers, the very tip of the finger will not always be the only contact point against the surface of the object. This can be seen, for example, in FIG. 5. While some of the fingers have their pointed ends against the surface of the object 106 (e.g., 104B-D), others touch along the slant or even at the heel of the slant (e.g. 104). Thus, the finger travel distance to a surface touched by the tip will be different than if the heel portion touches. The same would be true for other tip configurations, such as the rounded tip 126 illustrated in FIG. 12. Thus, refinement of the data usually involves an adjustment for the finger tip configuration as at 202. This refined data is then fed back to the input to be re-treated for display, etc.

In those instances where a decision at 188 is "no", the centroid data is translated to "coordinate zero" using known data-handling techniques at 204. This provides normalized data from which various features can be extracted at 206, such as volume, principal axes, etc. This information as to specific features can be compared to stored information pertaining to selected known shapes at 208. For example, the data for a particularly-shaped bolt could be in storage. This would be compared with the incoming data to determine if that data matches the particular bolt. If not, other stored data would be compared until there is a match. Usually the object will be recognized from this comparison (at 210). If it is recognized, any appropriate action can be taken as indicated at 212. If the object cannot be recognized, a decision can be made at 214 to either visually display that data (using the steps described above), or a decision can be made at 216 to further refine the data as to the finger tip shape (for example) as previously discussed. It is again emphasized that once a method of obtaining information signals corresponding to the position of each tip of the fingers of the present device has been selected, the processing of the data is accomplished using known techniques. These state of the art techniques have been developed for computerized graphics.

Having described fully the construction of several embodiments of the present invention, together with a system for treating the data obtained from the invention, it will be understood by those skilled in the art that the present invention has numerous applications for which there currently is no known device having comparable capabilities. For example, in underseas exploration where the water is often murky, the present invention can be used to contact/grasp an object and provide an identity thereof without a complete visual observation. Similar identification can be accomplished in other environments where there are hazards or handicaps for an individual. Further, when the fingers are individually provided with movement means, objects held by the present device can be reoriented while still being grasped in order to derive new data or facilitate placement of the object. This, then, adds another degree of movement that is not possible with conventional remotely-operated manipulators.

While only specific embodiments of the present invention have been described herein, these are not given as a limitation of the present invention but only as examples. Accordingly, the present invention is to be limited only by the appended claims and their equivalents when taken together with the detailed descriptions.

I claim:

1. A device for engaging an object having a surface, said device providing signal information related to the shape of said surface of said object, which comprises:

a housing for placement proximate said surface of said object;

a plurality of finger units carried by said housing, said finger units each having a first end for engaging said surface, and a further end positioned within said housing, said plurality of finger units being sufficient in number to support said object when said object is engaged by said first ends of said finger units;

guide means for each of said finger units, said guide means providing for movement of said finger units along fixed paths relative to said housing;

movement means associated with each said finger units for selective movement of said finger units along their individual axes in said fixed paths from a reference first position stored within said housing to a second position to engage said surface of said object with said first ends, and for selective movement to return to said reference first position and release said surface of said object;

a distance measurement means associated with each of said finger units whereby an electrical signal is generated that is related to distance traveled by said first end of each said finger units along said fixed paths from said reference first position to said second position for effecting said engaging of said surface of said object by said first ends of said finger units, said electrical signal generated by said distance measurement means being uniquely related to said shape of said surface.

2. The device of claim 1 wherein said housing has first and second chambers spaced apart a fixed distance that defines a working volume therebetween for at least partially receiving said object, and said chambers each are provided with a set of said plurality of finger units, said set of finger units of said first chamber movable in said working volume by said movement means in a direction toward and away from said second chamber and said set of finger units or said second chamber movable in said working volume by said movement means in a direction toward and away from said first chamber whereby said object is engaged by first ends of said two sets of finger units when said finger units are in said second position, and said first ends are removed from said surface when said finger units are stored at said reference first position within said first and second chambers.

3. The device of claim 1 wherein said housing has a plurality of chambers arranged about a central axis and spaced apart to define a gap therebetween for receiving said object, and said chambers each being provided with a set of said plurality of finger units, said finger units of each said chambers movable by said movement means in a direction toward and away from said axis.

4. The device of claim 1 wherein said housing is centrally positioned within said object, said object having an interior surface, and said plurality of finger units are reciprocatively moved relative to an exterior surface of said housing for engaging said interior surface of said object.

5. The device of claim 1 wherein said housing is substantially a hemisphere defining a central cavity, and said finger units are reciprocatively moved along fixed arcuate paths relative to said housing into and out of a working volume corresponding to a remainder of a sphere of which said housing is a part to engage said object when positioned within said working volume, said finger units being arcuate in shape along their individual axes and arranged at varying radii of said hemisphere.

6. The device of claim 1 wherein said movement means provides for movement of said finger units in unison.

7. The device of claim 1 wherein said movement means provides for movement of said finger units individually.

8. The device of claim 1 wherein said movement means comprises apparatus for selectively applying and removing fluid pressure against said further ends of said finger units to effect said movement of said finger units.

9. The device of claim 8 wherein said housing defines an interior volume, and wherein said apparatus for selectively applying and removing fluid pressure to said further ends of said finger units communicates with said interior volume whereby said finger units are moved in unison.

10. The device of claim 8 wherein said housing defines a plurality of passageways equal in number to said finger units, said passageways having a first end communicating with said further end of operatively associated finger units, and a second end, and said apparatus for selectively applying and removing fluid pressure is connected to said second end of each said passageways.

11. The device of claim 10 wherein said apparatus for selectively applying and removing fluid pressure is provided with valve means for each said passageways whereby selected operation of said valve means selectively moves said finger units individually.

12. The device of claim 8 where in said apparatus for selectively applying and removing fluid pressure is a pneumatic system.

13. The device of claim 8 wherein said apparatus for selectively applying and removing fluid pressure is a hydraulic system.

14. The device of claim 7 wherein said movement means comprises electromagnetic coils within said housing surrounding each said finger unit whereby said finger units are moved linearly by application of current to said coils.

15. The device of claim 1 wherein said distance measurement means comprises:

a resistive surface along at least a portion of each of said finger units, said resistive surface having a selected resistance value;

at least one electrical contact carried by said housing for slidable engagement with said resistive surface;

at least one further electrical contact engaged with said resistive surface; and a circuit means for determining a change in resistance as effected by movement of said electrical contact along said resistive surface during movement of said finger units, said change in resistance being proportional to the distance traveled by said finger unit from said housing.

16. The device of claim 1 wherein said distance measurement means comprises:

a capacitor formed within said housing, said capacitor having a first plate positioned within said housing, said finger unit forming a second plate; and circuit means connected between said first and second plates whereby said capacitor forms a portion of an oscillator circuit within said circuit means, said oscillator circuit producing an output frequency signal proportional to the distance traveled by said finger unit from said housing.

17. The device of claim 1 wherein said distance measurement means comprises:
   an inductor formed within said housing, said inductor having a coil encircling each said finger unit, said finger unit moving within said coil to effect a change of inductance of said inductor; and
   circuit means connected to said inductor whereby said inductor forms a portion of an oscillator circuit within said circuit means, said oscillator circuit producing an output frequency signal proportional to the distance traveled by said finger unit from said housing.

18. The device of claim 1 wherein said distance measurement means comprises:
   a digital encoded marking carried by each said finger unit, said marking defining axial distance units of a preselected code along said finger unit;
   an encoder reader head positioned within said housing so as to be proximate to said marking on said finger unit; and
   circuit means connected to said reader head to produce an output electrical signal corresponding to the distance traveled by said finger unit from said housing as determined by said marking and said reader head.

19. The device of claim 18 wherein said digital encoder marking is a magnetic means, and said reader head is responsive to said magnetic means.

20. The device of claim 18 wherein said digital encoder marking is an optical means, and said reader head is responsive to said optical means.

21. The device of claim 18 wherein said digital encoder marking is a conductive means, and said reader head is responsive to said conductive means.

22. The device of claim 1 wherein said first end of each of said plurality of finger units for engaging said surface of said object defines a centrally-located apex.

23. The device of claim 1 wherein said first end of each of said plurality of finger units for engaging said surface of said object defines a hemispherical surface.

24. The device of claim 1 further comprising electrical signal processing means for receiving said signals generated by said distance measurement means of each of said finger units for computing said shape and other parameters of said object.

25. A device for engaging an object having an external surface, said device providing information uniquely related to the shape of said external surface of said object, which comprises:
   a housing having first and second chambers that are spaced apart a fixed distance to define a working volume therebetween for at least partially receiving said object;
   a plurality of finger units carried by each said first and second chambers, said finger units each having a first end for engaging said surface and a further end positioned within said chambers, said finger units being movable along fixed paths from a first position stored within said chambers into said working volume to a second position for engaging said surface;
   guide means for each of said finger units, said guide means restricting movement of said finger units to said fixed paths;
   movement means associated with each of said finger units of said first and second chambers for reciprocative movements of said finger units along their individual axes from said first position relative to said first and second chambers to said second position where said first ends of said finger units engage said surface of said object and to selectively return to said first position, said movement means having apparatus for selectively applying and removing fluid pressure against said further ends of said finger units to effect said reciprocative movement of said finger units between said first and second positions; and
   a distance measurement means associated with each said finger unit whereby an electrical signal is generated that is related to distance traveled from said first position into said working volume for engaging said surface of said object by said first ends of said finger units, said electrical signal being uniquely related to said shape of said surface.

26. The device of claim 25 wherein each of said finger units is substantially an elongated cylinder and wherein said first ends of said finger units to engage said surface each define a substantially conical surface having a centrally positioned apex.

27. The device of claim 25 wherein said first and second chambers each define an interior volume, and wherein said apparatus for selectively applying and removing said fluid pressure to said further ends of said finger units communicates with both said interior volumes whereby said finger units are moved in unison.

28. The device of claim 25 further comprising signal processing means for receiving said electrical signals from said distance measurement means of each of said finger units for computing said shape of said surface of said object.

29. The device of claim 25 wherein said distance measurement means comprises:
   an encoded marking carried by each said finger unit, said marking defining axial distance units of a preselected code along said finger unit;
   an encoder reader head positioned within said housing so as to be proximate to said marking on said finger unit; and
   circuit means connected to said reader head to produce an output electrical signal corresponding to the distance traveled by said finger unit from said housing as determined by said marking and said reader head.

30. The device of claim 25 wherein said first and second chambers each define a plurality of passageways equal in number to said finger units of each said chambers, said passageways having a first end communicating with said further end of operatively associated finger units, and a second end, said apparatus for selectively applying and removing said fluid pressure being connected to said second end of each said passageway through a valve means for each passageway whereby selected operation of said valve means selectively moves said finger units individually.

31. The device of claim 25 further comprising mounting means on said housing for attachment of said housing to manipulating means to facilitate movement of said housing whereby said working volume receives said object.

32. A device for engaging an object having an external surface, said device providing information related to the shape of said surface of said object, which comprises:
- a housing having spaced-apart first and second chambers that each define an interior volume and further define a working volume between said chambers for at least partially receiving said object;
- a plurality of finger units carried by each said first and second chambers, said finger units being substantially elongated cylinders with a central axis having a first end for engaging said surface, said first end defining a substantially conical surface with a centrally positioned apex, and a further end positioned within said chambers, said finger units being movable along fixed paths from said chambers into said working volume, said finger units of said first chamber being substantially opposed to said finger units of said second chamber;
- guide means for each of said finger units, said guide means restricting movement of said finger units to said fixed paths;
- movement means associated with said finger units of each said first and second chamber to effect reciprocative movement of said finger units in said fixed paths along their individual axes relative to said first and second chambers and said working volume, said movement means having apparatus for selectively applying and removing fluid pressure against said further ends of said finger units to effect said reciprocative movement; and
- a distance measurement means associated with each said finger unit whereby an electrical signal is generated that is related to distance traveled by said first end of said finger units into said working volume to engage said surface, said distance measurement means including an encoding marking defining axial distance along said finger unit, an encoder reader head proximate each said finger unit in said chambers, and circuit means connected to said reader head to produce said output electrical signal corresponding to the distance traveled by said finger unit from said chambers as determined from said marking and said reader means, said electrical signal generated by said distance measurement means being related to said shape of said surface.

33. The device of claim 32 further comprising signal processing means connected to said circuit for producing said output electrical signal corresponding to finger unit travel distance, said signal processing means computing said shape of said surface of said object from said output electrical signals of said distance measurement means of all said finger units.

34. The device of claim 32 further comprising mounting means on said housing for attachment of said housing to manipulating means to facilitate movement of said housing whereby said working volume receives said object.

35. The device of claim 32 wherein said first and second chambers each define an interior volume, and wherein said apparatus for selectively applying and removing said fluid pressure to said further ends of said finger units communicates with both said interior volumes whereby said finger units are moved in unison.

36. The device of claim 32 wherein said first and second chambers each define a plurality of passageways equal in member to said finger units of each said chambers, said passageways having a first end communicating with said further end of operatively associated finger units, and a second end, said apparatus for selectively applying and removing said fluid pressure being connected to said second end of each said passageway through a valve means for each passageway whereby selected operation of said valve means selectively moves said finger units individually.

* * * * *